United States Patent
Schiel

(10) Patent No.: US 9,047,795 B2
(45) Date of Patent: Jun. 2, 2015

(54) METHODS AND DEVICES FOR PROVIDING A WALLPAPER VIEWFINDER

(75) Inventor: Byron Allen Schiel, Coral Springs, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 188 days.

(21) Appl. No.: 13/428,220

(22) Filed: Mar. 23, 2012

(65) Prior Publication Data

US 2013/0249939 A1  Sep. 26, 2013

(51) Int. Cl.
*G09G 5/00* (2006.01)
*G06F 3/14* (2006.01)
*G06F 3/048* (2013.01)

(52) U.S. Cl.
CPC .. *G09G 5/00* (2013.01); *G06F 3/14* (2013.01); *G06F 3/048* (2013.01); *G09G 2340/12* (2013.01); *G09G 2354/00* (2013.01)

(58) Field of Classification Search
USPC .......................................................... 345/629
See application file for complete search history.

(56) References Cited

U.S. PATENT DOCUMENTS

| | | | |
|---|---|---|---|
| 5,477,264 A | 12/1995 | Sarbadhikari et al. | |
| 7,312,798 B2 * | 12/2007 | Yach et al. | 345/589 |
| 7,609,847 B2 * | 10/2009 | Widdowson et al. | 382/100 |
| 7,652,693 B2 | 1/2010 | Miyashita et al. | |
| 8,564,619 B2 * | 10/2013 | Alberth et al. | 345/629 |
| 2005/0071771 A1 * | 3/2005 | Nagasawa et al. | 715/765 |
| 2006/0077266 A1 | 4/2006 | Nurmi | |
| 2007/0086773 A1 | 4/2007 | Ramsten et al. | |
| 2009/0103144 A1 | 4/2009 | Kim | |
| 2010/0235768 A1 | 9/2010 | Agevik et al. | |
| 2011/0090388 A1 | 4/2011 | Yoon et al. | |
| 2011/0148917 A1 * | 6/2011 | Alberth et al. | 345/629 |
| 2011/0238676 A1 | 9/2011 | Liu et al. | |
| 2012/0013553 A1 * | 1/2012 | Kim et al. | 345/173 |
| 2012/0050316 A1 * | 3/2012 | Rainisto et al. | 345/619 |
| 2012/0274551 A1 * | 11/2012 | Ishizuka et al. | 345/156 |

FOREIGN PATENT DOCUMENTS

EP  2189898 A1  5/2010

OTHER PUBLICATIONS

Extended European Search report mailed Oct. 8, 2012, in corresponding European patent application No. 12160943.2.
Android Market, Camera Live Wallpaper, view and use your camera on your homescreen which was accessed as early as Nov. 24, 2011, and which is accessible at: http://play.google.com/store/apps/details?id=com.brayden.camera.
iLife'11,Iphoto'11 which was accessed as early as Nov. 25, 2011, and which is accessible at http://www.apple.com/ilife/iphoto.

(Continued)

*Primary Examiner* — M Good Johnson
(74) *Attorney, Agent, or Firm* — Fish & Richardson P.C.

(57) ABSTRACT

Methods and electronic devices for providing a wallpaper viewfinder are described. In one aspect, a method includes: receiving image data from a camera of the electronic device; displaying a viewfinder for the camera on a display of the electronic device based on the image data; identifying a subject in the image data; and overlaying one or more interface element representations on a portion of the displayed viewfinder which does not contain the identified subject, the interface element representations depicting interface elements associated with a graphical user interface of the electronic device.

16 Claims, 6 Drawing Sheets

(56) References Cited

OTHER PUBLICATIONS

Dummies.com making everything easier, clean up your desktop with windows vista which was accessed as early as Nov. 24, 2011, and which is accessible at: http://www.dummies.com/how-to/content/clean-up-your-desktop-in-windows-vista.html.

E-how, How to stop vista from rearranging the desktop which was accessed as early as Nov. 24, 2011, and which is accessible at: http://www.ehow.com/how_5935894_stop-vista-rearranging-desktop.html.

E-how, How to download a wallpaper to an iPad, which was accessed as early as Nov. 24, 2011, and which is accessible at: http:www.ehow.com/how_8175195_download-wallpaper-ipad.html.

\* cited by examiner

METHODS AND DEVICES FOR PROVIDING A WALLPAPER VIEWFINDER

TECHNICAL FIELD

The present disclosure relates to electronic devices having cameras, and more particularly, to methods and electronic devices for providing a wallpaper viewfinder.

BACKGROUND

Electronic devices, such as smartphones and tablet computers, are equipped with graphical user interfaces (GUIs) to provide the user with an interface to interact with the electronic devices. A GUI is a type of user interface that allows a user to interact with an electronic device utilizing images rather than text commands. A GUI may include various interface elements, such as buttons and icons, which may be selected by a user. For example, an electronic device may include a desktop or home GUI as the main GUI to interact with the electronic device.

A GUI, such as a desktop or home GUI, often includes a wallpaper as a background for the GUI. A wallpaper is an image used as a background for a GUI. Electronic devices often allow a user to change the wallpaper of a GUI. For example, a user may set the wallpaper to an image that is aesthetically pleasing or memorable to the user. However, an image that is set as a wallpaper may not appear optimally to a user. For example, the interface elements associated with the GUI may unsuitably interfere with the image when the image is used as a wallpaper.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one aspect, the present application describes a processor-implemented method for providing a wallpaper viewfinder on an electronic device. The method includes: receiving image data from a camera of the electronic device; displaying a viewfinder for the camera on a display of the electronic device based on the image data; identifying a subject in the image data; and overlaying one or more interface element representations on a portion of the displayed viewfinder which does not contain the identified subject, the interface element representations depicting interface elements associated with a graphical user interface of the electronic device.

In another aspect, the present application describes an electronic device. The electronic device includes a memory, a display, and a camera. The electronic device also includes a processor coupled with the memory, the display, and the camera. The processor is configured to: receive image data from the camera; display a viewfinder for the camera on the display of the electronic device based on the image data; identify a subject in the image; and overlay one or more interface element representations on a portion of the displayed viewfinder which does not contain the identified subject, the interface element representations depicting interface elements associated with a graphical user interface of the electronic device.

In yet another aspect, the present application describes a computer-readable storage medium. The computer-readable storage medium has stored thereon computer executable instructions. The computer executable instructions include instructions for: receiving image data from a camera; displaying a viewfinder for the camera on a display of an electronic device based on the image data; identifying a subject in the image; and overlaying one or more interface elements representations on a portion of the displayed viewfinder which does not contain the identified subject, the interface element representations depicting interface elements associated with a graphical user interface of the electronic device.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
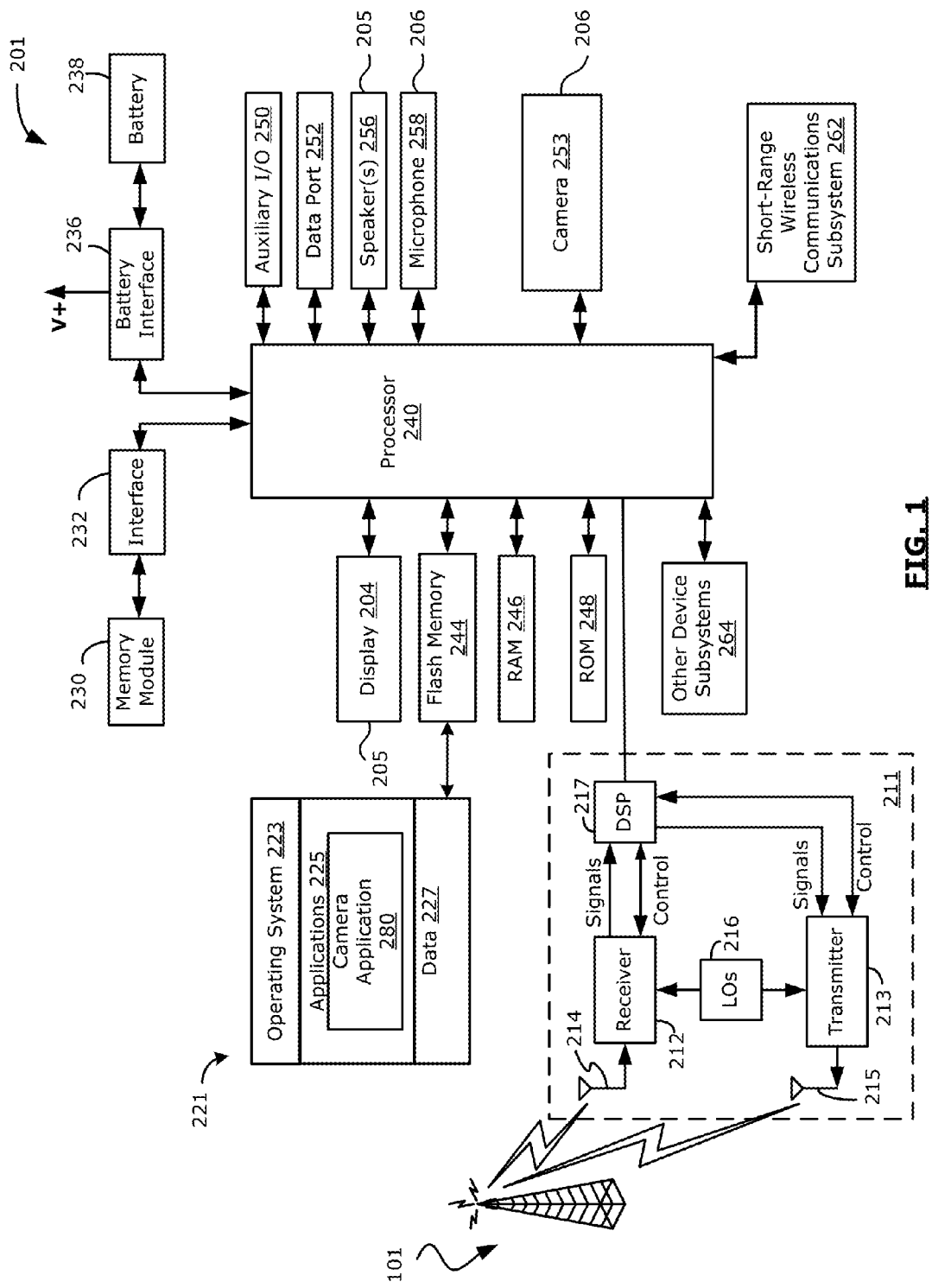
FIG. 1 is a block diagram illustrating an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a camera 253, a microphone 258, a keyboard (not shown), control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range wireless communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The electronic device 201 may include a communication subsystem 211 which allows the electronic device 201 to communicate over a wireless network 101. The communication subsystem 211 includes a receiver 212, a transmitter 213, and associated components, such as one or more antenna elements 214, 215, local oscillators (LOs) 216, and a processing module such as a digital signal processor (DSP) 217. The antenna elements 214, 215 may be embedded or internal to the electronic device 201 and a single antenna may be shared by both receiver 212 and transmitter 213. The particular design of the wireless communication subsystem 211 depends on the wireless network 101 in which the electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver 212 and transmitter 213 control. For example, the gains applied to communication signals in the receiver 212 and the transmitter 213 may be adaptively controlled through automatic gain control algorithms implemented in the DSP 217.

In at least some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a camera 253. The camera 253 is capable of capturing camera data, such as images (in which case the camera data may be referred to as image data), in the form of still photo and/or motion data. The camera data may be captured in the form of an electronic signal which is produced by an image sensor associated with the camera 253.

The camera 253 may be configured as a front facing camera or a rear facing camera. A front facing camera is provided by a camera 253 which is located to obtain images near a front face of the electronic device 201. The front face is typically the face on which a main display 204 is mounted. That is, when a front facing camera is provided on the electronic device 201, the display 204 is configured to display content which may be viewed from a side of the electronic device 201 where the cameras 253 is directed.

The camera 253 of the front facing camera may be located above or below the display 204. In at least some example embodiments, the camera 253 may be provided in a central location relative to the display 204 to facilitate image acquisition of a face. For example, the camera 253 may be located centrally above the display 204.

A rear facing camera is provided by a camera 253 which is located to obtain images of a subject near a rear face of the electronic device 201. The rear face is typically a face which does not include the main display 204 of the electronic device 201. In at least some embodiments, the display 204 of the electronic device 201 may act as a viewfinder displaying image data associated with a rear facing camera. In such example embodiments, the electronic device 201 may include various operating modes for the viewfinder (for example, in one operating mode, the electronic device 201 provides a wallpaper viewfinder).

The rear facing camera may obtain images which are not within the field of view of the front facing camera. The field of view of the front facing and rear facing cameras may generally be in opposing directions.

While FIG. 1 illustrates a single camera 253, the electronic device 201 may include a plurality of cameras 253. For example, in at least some example embodiments, the electronic device 201 may include both a front facing camera and a rear facing camera.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, image data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

In at least some example embodiments, the operating system 223 may be configured to display a Graphical User Interface (GUI) to provide a user with an interface to interact with the electronic device 201. A GUI is a type of user interface that allows a user to interact with the electronic device 201 utilizing images. A GUI may include various interface elements (for example, a button, icon, text, hyperlink, etc.) which may be selected by a user using an input interface 206. In at least some example embodiments, an interface element may be a shortcut for accessing an application. That is, a selection of the interface element may cause the electronic device 201 to execute an associated application 225. For example, a selection of a Microsoft Word™ interface element may execute the Microsoft Word™ application by Microsoft Corp.

The operating system 223 may be configured to display a main GUI, such as a desktop (or home) GUI to allow a user to interact with the electronic device 201. A desktop GUI provides a comprehensive user interface. The desktop GUI may be displayed by default during the operation of the electronic device 201, and may provide an environment for a user to interact with the electronic device 201. Example desktop GUIs may include Microsoft Windows™ by Microsoft Corp., Android™ by Google, Blackberry OS™ by Research in Motion, iOS™ by Apple, OS X Lion™ by Apple, Inc., etc.

A GUI, such as a desktop GUI, may include a wallpaper as a background. A wallpaper is an image used as a background for a GUI. The operating system 223 may allow a user to configure the wallpaper of the GUI. That is, a user may add, delete and/or modify a wallpaper of a GUI based on the user's preference. For example, a user may set the wallpaper of a GUI to an image of the user's family or another image which is pleasing to the user.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the camera 253 to allow the processor 240 to receive electronic signals representing camera data from the camera 253.

In at least some example embodiments, the software modules 221 may include one or more camera applications 280 or software modules which are configured for handling the electronic signals representing camera data from the camera 253. The camera application 280 may, for example, be configured to provide a viewfinder on the display 204 by displaying, in real time or near real time, images defined in the electronic signals received from the camera 253. The camera application 280 may also be configured to capture images or videos by storing images or videos defined by the electronic signals received from the camera 253. For example, the camera application 280 may be configured to store the images or videos to memory, for example the flash memory 244, of the electronic device 201. The images may be stored in various formats including JPEG, RAW, BMP, etc.

The camera application 280 may also be configured to control options or preferences associated with the camera 253. For example, the camera application 280 may be configured to control a camera lens aperture and/or shutter speed associated with the camera 253. The control of such features may, in at least some embodiments, be automatically performed by the camera application 280 based on output received from a light exposure meter.

The camera application 280, may in various example embodiments, control any one or more of a number of various camera related features and options. For example, in at least some example embodiments, the camera application 280 may be configured to control a flash associated with the camera 253 and/or to control a zoom associated with the camera 253. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280 may, in at least some example embodiments, provide image stabilization for the camera 253. Image stabilization may reduce blurring associated with movement of the camera 253.

In at least some example embodiments, the camera application 280 may be configured to focus the camera 253 on a subject (i.e. an identifiable item, such as an individual or thing). For example, the camera application 280 may be configured to control actuators of the camera 253 to move lenses (a lens may be comprised of one or more lens elements) in the camera 253 relative to an image sensor in the camera 253. For example, when capturing images of subject which are very far from the camera 253, the camera application 280 may control the actuators to cause the actuators to move the lenses away from the image sensor (i.e. to magnify the subject).

In at least some example embodiments, the camera application 280 may provide for auto-focusing capabilities. For example, the camera application 280 may analyze received electronic signals to determine whether the images captured by the camera 253 are in focus. That is, the camera application 280 may determine whether the images defined by electronic signals received from the camera 253 are focused properly on the subject of such images. The camera application 280 may, for example, make this determination based on the sharpness of such images. If the camera application 280 determines that the images are not in focus, then the camera application 280 may cause the processor 240 to adjust the actuators which controls the lenses to focus the images.

In at least some example embodiments, the camera application 280 may provide various operating modes for operating the camera 253. For example, in one operating mode, the camera application 280 may enable the electronic device 201 to provide a wallpaper viewfinder for the camera 253. In some embodiments, the wallpaper viewfinder may be provided within a selectable operating mode, which may be referred to as a wallpaper viewfinder mode. In at least some embodiments, a user may input an instruction to the electronic device 201 via an input interface 206 which instructs the electronic device 201 to enter the wallpaper viewfinder mode. In response to receiving such an instruction, the electronic device 201 may change its active operating mode to the wallpaper viewfinder mode.

In at least some example embodiments, in the wallpaper viewfinder operating mode, the camera application 280 may receive real-time image data from the camera 253 of the electronic device 201. In response to receiving the image data, the camera application 280 may display a viewfinder for the camera 253 on a display 204 of the electronic device 201 based on the received image data. The camera application 280 may be configured to identify a subject in the image data, and to overlay one or more interface element representations on a portion of the displayed viewfinder which does not contain the identified subject (the interface element representations may depict interface elements associated with a GUI of the electronic device 201).

Accordingly, the wallpaper viewfinder may facilitate the acquisition of an image to be used as wallpaper. That is, the wallpaper viewfinder may allow a user to preview image data from a camera as wallpaper for a GUI of the electronic device. That is, the wallpaper viewfinder allows a user to observe the appearance of a GUI if image data from the camera 253 were to be used as a wallpaper for the GUI.

In at least some embodiments, the wallpaper viewfinder mode may be configured to automatically arrange one or more features of the GUI (such as one or more interface elements) when displaying the preview of the image data as wallpaper. For example, the electronic device 201 may identify an important feature of the image (such as a subject of the image) and may automatically rearrange GUI features so that such features do not conflict with the identified important feature. For example, icons or other interface elements may be rearranged so they do not cover the subject of the image.

Specific functions and features of the camera application 280 will be discussed in greater detail below with reference to FIGS. 4 to 8.

While the embodiment discussed above includes a processor 240 coupled with a camera application 280 which collectively act as an image signal processor to provide image related functions such as auto-focusing, in other example embodiments (not shown), another processor such as a dedicated image signal processor, may provide some or all of these functions.

In at least some example embodiments, the operating system 223 may perform some or all of the functions of the camera application 280. In other example embodiments, the functions or a portion of the functions of the camera application 280 may be performed by one or more other applications. For example, in at least some example embodiments, the identification and/or overlay functions (which will be described below in greater detail with reference to FIGS. 4 to 8) may be performed by other applications.

Further, while the camera application 280 has been illustrated as a stand-alone application, in other example embodiments, the camera application 280 may be implemented as part of the operating system 223 or another application 225. Furthermore, in at least some example embodiments, the functions of the camera application 280 may be provided by a plurality of software modules. In at least some example embodiments, these software modules may be divided among multiple applications.

Example Smartphone Electronic Device

As discussed above, the electronic device 201 may take a variety of forms. For example, in at least some example embodiments, the electronic device 201 may be a smartphone.

Figure 2:
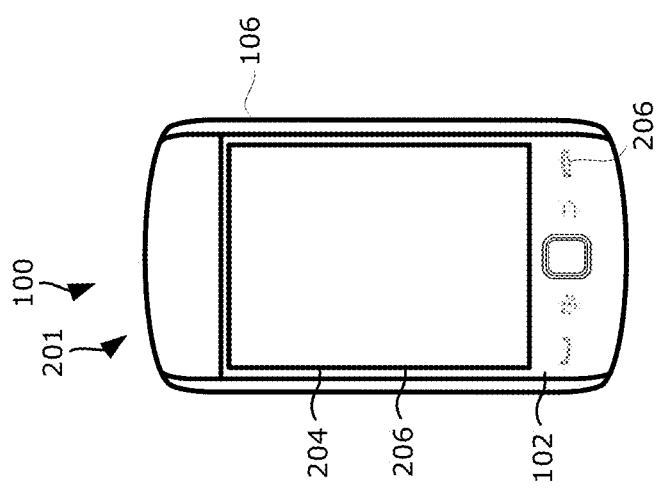
FIG. 2 is a front view of an example smartphone in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone 100.

The smartphone 100 may include the components discussed above with reference to FIG. 1 or a subset of those components. The smartphone 100 includes a housing 106 which houses at least some of the components discussed above with reference to FIG. 1.

In the example embodiment illustrated, the smartphone 100 includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 106.

The example smartphone 100 also includes other input interfaces 206 such as one or more buttons, keys or navigational input mechanisms. In the example embodiment illustrated, at least some of these additional input interfaces 206 are disposed for actuation at a front side 102 of the smartphone.

Figure 3:
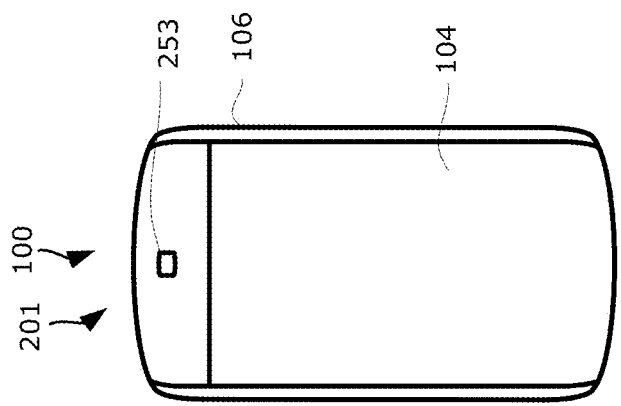
FIG. 3 is a rear view of the example smartphone of FIG. 2.

Referring now to FIG. 3, the example smartphone 100 also includes a rear facing camera 253 on a rear side 104 of the smartphone 100. That is, the rear facing camera 253 is located on a side of the smartphone 100 which does not include the display 204. The rear facing camera 253 is located so that it may capture images of subject which are located in the rear of and/or surrounding the rear side 104 of the electronic device 201.

In at least some example embodiments, the display 204, on the front side 102 of the electronic device 201, acts as a viewfinder, displaying image data associated with the rear facing camera 253 on the rear side 104 of the electronic device 201. In such example embodiments, the electronic device 201 may include various operating modes for the viewfinder. For example, in one operating mode, the display 204 may act as a wallpaper viewfinder displaying image data (associated with the camera 253) along with interface element representations depicting interface elements associated with a GUI of the electronic device 201.

In at least some example embodiments, the smartphone 100 may also include a front facing camera instead of, or in addition to, the rear facing camera 253. The front facing camera may be located on the front side 102 of the smart phone 100. The front facing camera is located so that it may capture images of subjects which are located in front of and/or surrounding the front side 102 of the smartphone 100.

Providing a Wallpaper Viewfinder

Figure 4:
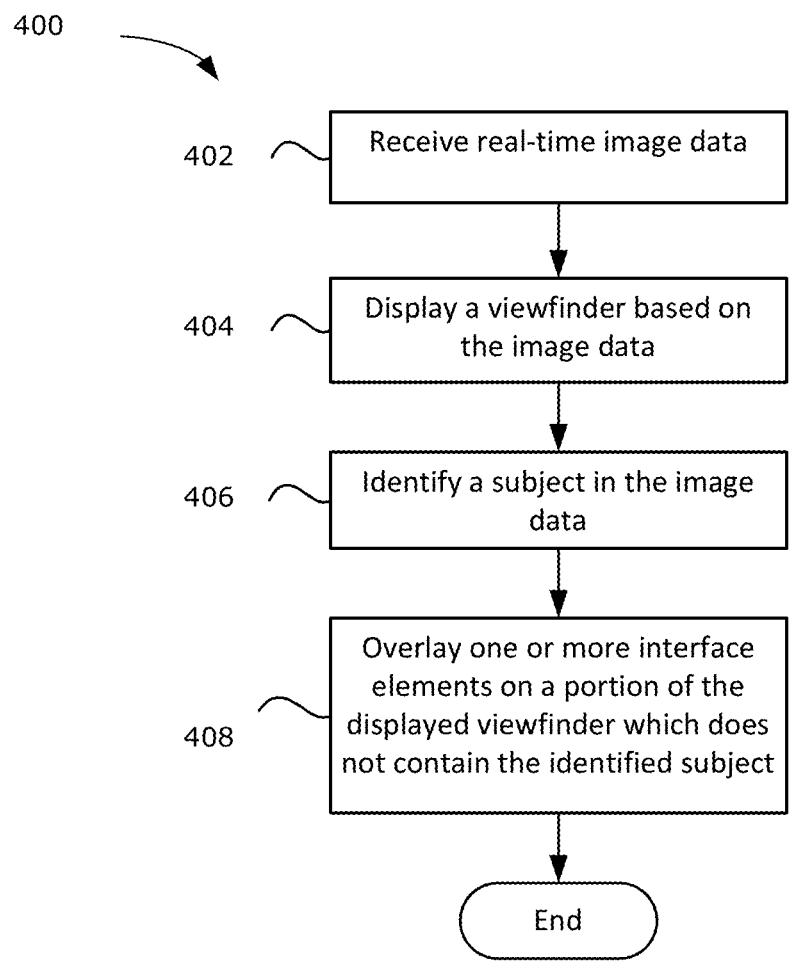
FIG. 4 is a flowchart illustrating an example method of providing a wallpaper viewfinder in accordance with example embodiments of the present disclosure.

Reference will now be made to FIG. 4, in which an example method 400 of providing a wallpaper viewfinder is illustrated in flowchart form. The electronic device 201 may be configured to perform the method 400 of FIG. 4. In at least some example embodiments, the processor 240 of the electronic device 201 is configured to perform the method 400 of FIG. 4. One or more applications 225 or modules on the electronic device 201 may contain computer readable instructions which cause the processor 240 of the electronic device 201 to perform the method 400 of FIG. 4. In at least some example embodiments, the camera application 280 stored in memory of the electronic device 201 is configured to perform the method 400 of FIG. 4. More particularly, the camera application 280 may contain computer readable instructions which, when executed, cause the processor 240 to perform the method 400 of FIG. 4. It will be appreciated that the method 400 of FIG. 4 may, in at least some example embodiments, be provided by other software applications or modules apart from those specifically discussed above; for example the operating system 223. Accordingly, any features which are referred to as being performed by the electronic device 201 may be performed by any one or more of the software applications or modules referred to above or other software modules. In at least some example embodiments, at least some of the method 400 of FIG. 4 may be performed by or may rely on other applications 225 or modules.

At 402, the electronic device 201 receives real-time image data from a camera 253 of the electronic device 201. That is, the electronic device 201 obtains image data in real-time from the camera 253.

In at least some embodiments, the real-time image data is received when an operating mode, such as a wallpaper viewfinder mode, of the electronic device 201 is selected. For example, the camera 253 may be enabled in the camera operating mode to acquire real-time image data. That is, the camera 253 may be operating to acquire image data of a subject which is viewable by the camera 253. The camera 253 may acquire real-time image data of subjects that are within the line of sight of the camera 253. For example, for a rear facing camera (as illustrated in FIG. 3), the camera 253 may acquire real-time image data of a subject which is located in the rear area of the electronic device 201.

In at least some example embodiments, the wallpaper viewfinder mode may be selected in response to receiving an instruction to enable the wallpaper viewfinder mode. The instruction may be received, for example, from an input interface 206 associated with the electronic device 201. For example, the instruction may be received from a navigational input device such as a trackball, a trackpad or a touchscreen display, or a physical keyboard associated with the electronic device 201. In response to receiving such an instruction, the electronic device 201 may provide the wallpaper viewfinder mode (e.g. 402 may be performed in response to receiving an instruction to enable the wallpaper viewfinder mode).

At 404, the electronic device 201 displays a viewfinder for the camera 253 based on the image data. For example, the display 204 of the electronic device 201 may operate as a viewfinder based on the image data. The viewfinder allows a user to view the field of view of the camera 253, to allow the user to frame and focus an image. The viewfinder may display the effects of configuration features (such as zooming, focusing, etc.) when capturing an image of the subject). That is, a viewfinder is displayed on the display 204 based on the received real-time image data.

The electronic device 201 may identify one or more important features in the image data. For example, at 406, the electronic device 201 may identify a subject in the image data. For example, the electronic device 201 may analyze the image data to identify a subject. The subject of the image may be a person or thing that the image is meant to capture. For example, the subject of the image may be a person or thing which the image is focussed on.

In at least some example embodiments, analyzing (at 406) may include identifying one or more boundaries associated with the subject in the image data. For example, a subject may include a person within an image (which may, for example, have a landscape as the background). The electronic device 201 may identify the boundaries of the person within the image of the landscape. The boundaries may, in at least some example embodiments, represent a perimeter of a subject. That is, the boundary may be a continuous line which forms the boundary of a geometric figure (i.e. the subject).

In at least some example embodiments, the electronic device may identify boundaries associated with the subject by performing image segmentation. Image segmentation is a process of partitioning an image defined by electronic signals into multiple segments, such as pixels (a pixel is the smallest unit of an image that can be represented, and is a sample of the image. Each pixel has its own address, and the address may correspond to its coordinates in relation to the image). A label is assigned to every segment in the image such that same labels share certain visual characteristics, for example, colour, intensity, texture, depth, etc. The image segmentation results in a set of segments that collectively cover the entire image. Each of the segments within a set are similar with respect to a certain visual characteristic resulting in differentiating sets of visual characteristics within the image. The differentiating sets may be used to locate boundaries of a subject in the image. For example, in performing image segmentation, the electronic device 201 may identify the region of a subject (i.e. the region encompassing the perimeter of a subject) as having a different set of visual characteristic than the rest of the regions of the image.

In at least some example embodiments, the electronic device 201 may perform edge detection in order to identify one or more boundaries associated with the subject. Edge detection is a process of identifying points in an image at which the image brightness has discontinuities. Discontinuities in the image brightness may correspond to discontinuities in depth, illumination, etc. of the image. Identification of the points may result in connecting lines that indicate the boundaries of a subject in an image as the boundaries are areas often associated with discontinuities in image brightness in an image. For example, in performing edge detection, the electronic device 201 may identify the boundaries (i.e. the perimeter) of a subject within an image as having discontinuities in image brightness in relation to other portions of the image.

In at least some example embodiments, the electronic device 201 may identify a subject in an image by analyzing the image data to identify facial features associated with the subject in the image data. That is, the electronic device 201 may perform face detection in order to identify facial features associated with the subject.

Face detection is a process of determining the location and size of a human face in an image. Face detection may detect facial features associated with a subject in an image, and ignore the remaining portions of the image. In performing face detection, the electronic device 201 may search the image for a human face and may identify any located human faces within the image.

After identifying a subject in the image data, the electronic device 201, at 408, overlays one or more interface element representations associated with a GUI on a portion of the displayed viewfinder which does not contain the identified subject. That is, the electronic device 201 overlays interface element representations (such as icons, etc.) for the GUI on the viewfinder so that the interface element representations do not interfere with the identified subject.

For example, the electronic device 201 may vary the position of one or more interface element representations on the displayed viewfinder by moving, removing and/or swapping one or more interface element representations. The location of the interface element representations may be varied to ensure that an identified subject is not covered or minimally covered by interface element representations. That is, the subject is displayed on the viewfinder without being obscured or minimally obscured by one or more interface element representations.

Greater details of the overlaying function are provided below with reference to FIGS. 5 to 8.

The interface element representations depict interface elements associated with a GUI of the electronic device. That is, the interface element representations are associated with corresponding interface elements on a GUI. The interface element representations may have the same graphical features and may initially occupy the same relative position on a displayed viewfinder in relation to the corresponding interface elements on a displayed GUI. That is, the positions of the interface elements on the GUI may provide a starting point when overlaying interface element representations on a viewfinder when providing the wallpaper viewfinder. As noted above, the actual positions of the interface element representations overlaid on the viewfinder may vary from these starting positions to ensure that interface element representations do not conflict with important features of the image in the viewfinder.

In at least some example embodiments, the interface elements are icons providing shortcuts for accessing applications, websites, and/or files. Interface element representations may visually represent the interface elements. For example, where an interface element is an icon, a corresponding interface element representation may depict the icon.

In at least some example embodiments, the interface element representations are selectable. That is, the interface element representations may be selected to perform a function. For example, if an interface element representation is associated with a corresponding interface element icon that is a shortcut for accessing an application, then a selection of the interface element representation may access the associated application. In such embodiments, the interface element representations effectively act as the interface elements. Accordingly, in some such embodiments, the interface element representations may be the interface elements themselves.

However, in at least some example embodiments, the interface element representations are not selectable. That is, the interface elements may not be selected and are not associated with any functions. In such example embodiments, the interface element representations are simply graphical features which depict the interface elements but which do not, themselves, act as interface elements.

In at least some example embodiments, the electronic device 201 may automatically overlay the interface element representations on the viewfinder. That is, the electronic device 201 overlays the interface element representations without the need for further user input. However, in other example embodiments, further input is required from a user via an input interface 206 in order to overlay the interface element representations. For example, in at least some example embodiments, prior to overlaying, a prompt may be presented via an output interface 205 (such as a display 204) requesting confirmation to overlay the interface element representations. When confirmation is received by a user via an input interface 206 (such as a navigational input device), the interface element representations are overlaid.

After overlaying, in at least some example embodiments, the electronic device 201 may receive an instruction to capture an image. The instruction may be received by an input interface 206 associated with the electronic device 201. For example, the instruction may be received by a navigational input device such as a trackball, a trackpad or a touchscreen display, or a physical keyboard associated with the electronic device 201 to instruct the electronic device 201 to capture an image.

In response to receiving the instruction, the electronic device 201 captures an image with the camera 253. That is, the electronic device 201 causes the camera 253 to capture image data in response to a receipt of an instruction (for example, from a user) to capture an image. For example, the electronic device 201 may capture an image of a subject that is viewed on the viewfinder.

The electronic device 201, in at least some example embodiments, may display the captured image as a wallpaper on a GUI. That is, the captured image may be configured as a wallpaper on a GUI of the electronic device 201. For example, the captured image of a subject may be configured as a wallpaper on a desktop GUI of the electronic device 201. In at least some example embodiments, the captured image displayed as a wallpaper on a GUI may appear the same as the image displayed on the viewfinder, prior to capturing the image. For example, the position of the interface elements on the GUI may be varied according to the varied corresponding interface element representations. That is, the interface elements may be displayed as the interface element representations were displayed during the overlaying of the interface element representations at 408 (e.g. the interface elements may be given the same positions and arrangement as the interface element representations were given at 408). Accordingly, the image displayed as a wallpaper may not be obscured or may be minimally obscured by the interface elements (such as icons).

In at least some example embodiments, the electronic device 201 may automatically display the captured image as a wallpaper on a GUI. That is, the electronic device 201 displays the captured image as a wallpaper in response to receiving an instruction to capture an image without the need for further input from a user. However, in other example embodiments, further user input is required from a user via an input interface 206 in order to display the captured image as a wallpaper. For example, in response to capturing the image, a prompt may be presented via an output interface 205 (such as a display 204) to request confirmation to display the captured image as a wallpaper on a GUI of the electronic device 201. When confirmation is received by a user via an input interface 206 (such as a navigational input device), the captured image is displayed as a wallpaper on a GUI of the electronic device 201.

In at least some example embodiments, when the image is displayed as wallpaper on the GUI, the interface elements of the GUI may be arranged in the same manner that their associated interface element representations were arranged when the image was captured. That is, the arrangement of the interface element representations affects the arrangement of the interface elements when the captured image is displayed as wallpaper. The interface elements may reflect the manipulations made to the interface element representations.

In at least some example embodiments, the captured image may be stored in the memory, for example, the flash memory 244, of the electronic device 201.

Overlaying the Interface Element Representations

As noted above, after identifying a subject in the image data, the electronic device 201 may overlay one or more interface element representations on image data obtained from a camera to provide a wallpaper viewfinder. Example embodiments of such overlaying will now be described.

Figure 5:
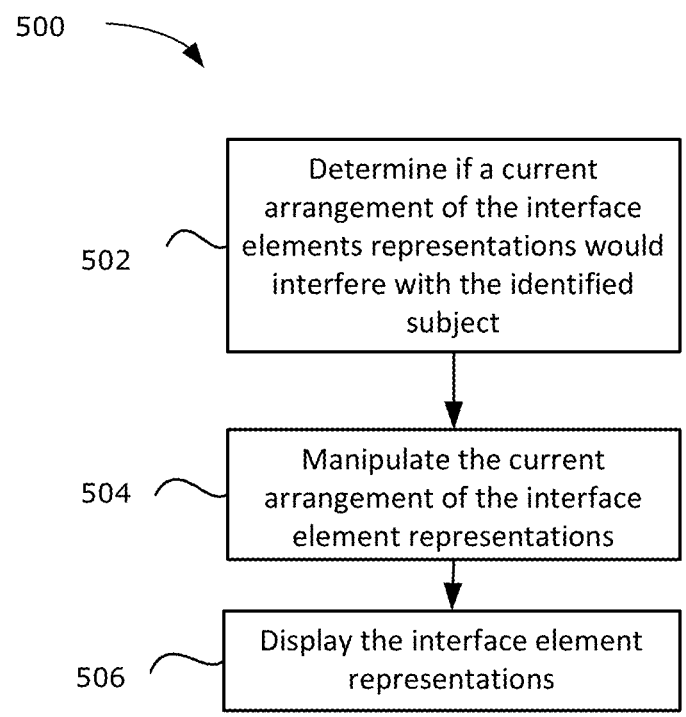
FIG. 5 is a flowchart illustrating an example method of overlaying interface element representations on a viewfinder in accordance with example embodiments of the present disclosure.

Referring now to FIG. 5, a flowchart of an example method of overlaying the interface element representations on a viewfinder is illustrated. The electronic device 201 may be configured to perform the method 500 of FIG. 5. In at least some example embodiments, the processor 240 of the electronic device 201 is configured to perform the method 500 of FIG. 5. One or more applications 225 or modules on the electronic device 201 may contain computer readable instructions which cause the processor 240 of the electronic device 201 to perform the method 500 of FIG. 5. In at least some example embodiments, the camera application 280 stored in memory of the electronic device 201 is configured to perform the method 500 of FIG. 5. More particularly, the camera application 280 may contain computer readable instructions which, when executed, cause the processor 240 to perform the method 500 of FIG. 5. It will be appreciated that the method 500 of FIG. 5 may, in at least some example embodiments, be provided by other software applications or modules apart from those specifically discussed above; for example the operating system 223. Accordingly, any features which are referred to as being performed by the electronic device 201 may be performed by any one or more of the software applications or modules referred to above or other software modules. In at least some example embodiments, at least some of the method 500 of FIG. 5 may be performed by or may rely on other applications 225 or modules.

In at least some example embodiments, the method 500 may be performed at 408 of the method 400 of FIG. 4.

The method 500 may include, at 502, determining whether a current arrangement of the interface element representations would interfere with the identified subject if the interface element representations were overlaid on the viewfinder. For example, the electronic device 201 may check whether the current arrangement of interface elements on the GUI would cause one or more interface elements representations to cover, or partially cover, the identified subject. The identified subject is displayed on a viewfinder in real-time along with the interface element representations. Accordingly, the electronic device 201 checks if the identified subject would be obscured by an interface element representation displayed on the viewfinder.

As noted above, the identified subject may be identified by one or more features of: image segmentation, edge detection, and/or face detection, etc. In at least some example embodiments, based on the feature performed to identify the subject, the electronic device 201 may accordingly determine if an interface element representation would interfere with the identified subject. For example, if face detection is performed to identify facial features of the subject, the electronic device 201 may check if an interface element representation covers or partially covers the identified face of the subject. In another example, if image segmentation or edge detection is performed to identify boundaries associated with the subject, the electronic device 201 may check if an interface element representation covers or partially covers the identified subject along the defined boundaries.

At 504, if it is determined that the current arrangement of the interface element representations would interfere with the identified subject, the electronic device 201 may manipulate the current arrangement of the interface element representations to provide a new arrangement of the interface element representations which does not interfere with the identified subject. For example, if the electronic device 201 determines that an interface element covers, or partially covers, the identified subject, the electronic device 201 may change the position of the interface element representation covering or partially covering the identified subject on the viewfinder. This change in position of the interface element representations defines a new arrangement of the interface element representations. The interface element representation covering or partially covering the identified subject may be moved or removed from the viewfinder, so that the subject may no longer be obscured by the interface element representation. That is, the subject may be viewed on the viewfinder without being obstructed by any interface element representations overlaid on the viewfinder.

After manipulating the current arrangement of the interface element representations, the electronic device 201, at 506, may display the interface element representations on the viewfinder in accordance with the new arrangement of the interface element representations (which does not interfere with the identified subject). That is, the subject is displayed on the viewfinder without being covered or partially covered by any interface element representations overlaid on the viewfinder. The subject displayed on the display in the wallpaper viewfinder mode is not interfered with by an interface element representation. The new arrangement of the interface element representations may include interface element representations overlaying portions surrounding the subject on the viewfinder (but may not overlay the subject itself)

The interface element representations depict interface elements associated with a GUI (such as the desktop GUI) of the electronic device 201. That is, an interface element representation overlaid on the viewfinder may be associated with a corresponding interface element on a GUI. The interface element representation may have the same graphical features and may occupy the same relative position on the displayed viewfinder in relation to the corresponding interface element on a displayed GUI (e.g. the electronic device 201 may map the interface elements on the GUI with the interface elements on the viewfinder). Accordingly, in at least some example embodiments, the new arrangement of the interface element representations may define the corresponding arrangement of the interface elements when the image is displayed as a wallpaper on a GUI. That is, the image displayed on the viewfinder with the overlaid new arrangement of the interface element representations may appear the same as the image when displayed as a wallpaper on a GUI with the corresponding re-arranged interface elements.

Figure 6:
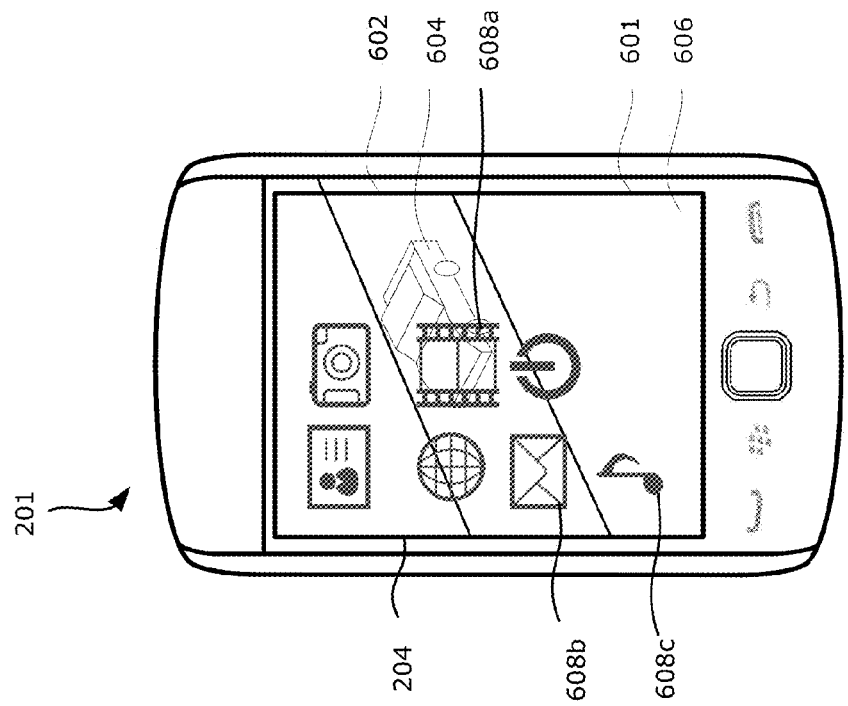
FIG. 6 is an example electronic device having a viewfinder in accordance with example embodiments of the present disclosure.

Example viewfinders will now be discussed with reference to FIGS. 6 and 7. FIG. 6 shows an example electronic device 201. The example electronic device 201 may be of the type described above with reference to FIGS. 1 to 3. In FIG. 6, the example electronic device 201 includes a viewfinder 601 on the display 204. The viewfinder 601 displays an image 602 and interface element representations 608*a*, 608*b*, 608*c*. The image 602 may be an image 602 viewed by a camera 253 of the smartphone 100, and displayed in real-time or near real-time on the display 204 to provide a viewfinder 601. The viewfinder 601 includes an image 601 and overlaid interface element representations 608*a*, 608*b*, 608*c*. The image 602 includes an identified subject 604 and a background 606 (for example, in the example illustrated, a car is the identified subject 604, and a road and the remaining portion of the image form the background 606). The identified subject 604 may be defined by boundaries which separate the subject from the background 606 of the image 602 displayed on the viewfinder 601.

The interface element representations 608*a*, 608*b*, 608*c* are overlaid on the viewfinder 601 and, in the example embodiment illustrated, interfere with portions of the displayed image (for example, a video icon interface element representation 608*a* interferes with the identified subject 604 (i.e. the car), and a message icon interface element representation 608*b* and music icon interface element representation 608*c* interferes with a portion of the background). The interface element representations 608*a*, 608*b*, 608*c* may depict interface elements associated with a GUI (for example, desktop GUI) of the electronic device 201. For example, the interface element representations 608*a*, 608*b*, 608*c* on the viewfinder may be mapped with interface elements (for example, icons) on a GUI of the electronic device 201 so that the interface elements displayed on the GUI are displayed in locations that correspond to the locations of interface element representations displayed on the viewfinder. The interface element representations 608*a*, 608*b*, 608*c* may or may not be selectable.

The example viewfinder 601 of FIG. 6 depicts the viewfinder 601 prior to any form of manipulation of the interface element representations (for example, the video icon interface element representation 608*a* is interfering with the identified subject 604, and obscuring the view of the identified subject 604). That is, the example viewfinder 601 illustrates how the viewfinder 601 might appear if the interface element representations were not manipulated to avoid interfering with the subject of the image.

Figure 7:
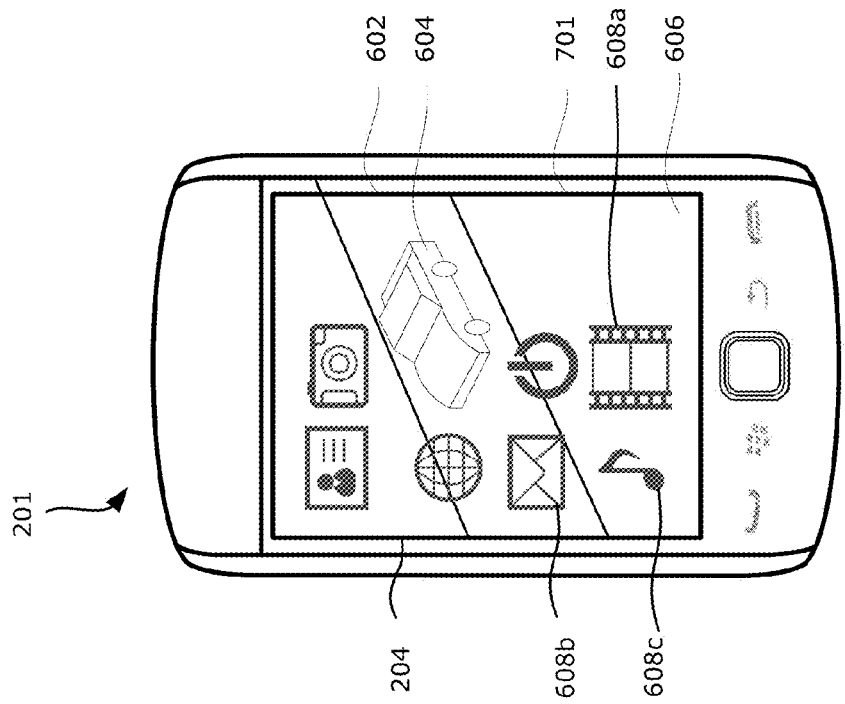
FIG. 7 is another example electronic device having a wallpaper viewfinder in accordance with example embodiments of the present disclosure.

Referring now to FIG. 7, an example electronic device 201 is again illustrated. The example electronic device 201 may be of the type described above with reference to FIGS. 1 to 3. In FIG. 7, the example electronic device 201 includes a viewfinder 701 on the display 204. The viewfinder 701 displays an image 602 and interface element representations 608*a*, 608*b*, 608*c* on the electronic device 201. The new viewfinder 701 depicts a viewfinder after manipulation of the interface element representations 608*a*, 608*b*, 608*c*. That is, the viewfinder 701 depicts a viewfinder after an arrangement of the interface element representations 608a, 608b, 608c (such as the arrangement shown in FIG. 6), is manipulated to form a new arrangement of the interface element representations 608a, 608b, 608c.

As noted above, in performing the overlaying function (for example, in the manner described above with reference to FIGS. 4 and 5), the electronic device 201 may manipulate the interface element representations 608a, 608b, 608c so that the interface element representations 608a, 608b, 608c do not interfere with the identified subject 604.

In at least some example embodiments, manipulating may include moving one or more interface element representations 608a, 608b, 608c within a current arrangement of the interface element representations 608a, 608, 608c. For example, an interface element representation 608a, 608b, 608c that is determined to be interfering with the identified subject 604 may be moved from a location on the viewfinder 601 to a new location on the new viewfinder 701. That is, the interface element representation 608a, 608b, 608c that is interfering with the identified subject 604 is moved to no longer cover or partially cover the identified subject 604. For example, an interface element representation 608a (such as the video icon) which is interfering with a subject (such as the car) is moved from its previous location as depicted on the viewfinder 601 of FIG. 6 to a new location as depicted on the new viewfinder of 701. That is, the moved interface element representation 608a no longer interferes with the subject. Interface element representations 608a, 608b, 608c that do not interfere with the identified subject 604 may not be moved (for example, the message icon interface element representation 608b and music icon interface element representation 608c are not moved as they do not interfere with the car). Accordingly, the new arrangement of the interface element representations 608a, 608b, 608c displayed on the new viewfinder 701 does not obstruct the view of the identified subject 604, and the identified subject 604 is viewable on the new viewfinder 701.

As noted above, the interface element representations 608a, 608b, 608c may depict interface elements associated with a GUI. Accordingly, in at least some example embodiments, the new arrangement of the interface element representations 608a, 608b, 608c displayed on the new viewfinder 701 may define the corresponding arrangement of the interface elements when the image 602 is displayed as a wallpaper on a GUI. That is, the viewfinder 701 with the overlaid new arrangement of the interface element representations 608a, 608b, 608c may display a true representation of a GUI which is subsequently displayed with a wallpaper based on the image 602. For example, a video icon interface element that may be associated with the video icon interface element representation 608a, may be moved accordingly on the GUI based on the moved video icon interface element representation 608a displayed on the new viewfinder 701.

In at least some example embodiments, manipulating may include removing one or more interface element representations 608a, 608b, 608c from the current arrangement of the interface element representations 608a, 608b, 608c. For example, an interface element representation 608a, 608b, 608c that is determined to be interfering with the identified subject 604 may be removed from the overlaid interface element representations 608a, 608b, 608c on the new viewfinder 701. That is, the interfering interface element representation 608a, 608b, 608c is no longer displayed on the new viewfinder 701 (in contrast to the previous viewfinder 601 of FIG. 6). The removed interface element representation 608a, 608c, 608c no longer covers any portion of the identified subject 604. For example, in the example illustrated, the video icon interface element representation 608a (which is interfering with the identified subject 604) may be removed in the new viewfinder 701 so that it no longer obstructs the view of the car displayed on the new viewfinder 701.

In at least some example embodiments, the new arrangement of interface element representations 608a, 608b, 608c after performing the removing function, may define the corresponding arrangement of the interface elements when the image 602 is displayed as a wallpaper on a GUI. In such example embodiments, the one or more interface elements that are associated with the one or more removed interface element representations 608a, 608b, 608c, may be accordingly removed from the GUI (for example, if the video icon interface element representation 608a is removed, the corresponding video icon interface element is removed from the GUI when the image is displayed as a wallpaper. That is, the video icon interface element on the displayed GUI is no longer visible). In at least some example embodiments, the removed associated interface element may be deleted (permanently or non-permanently) or moved to another location on the electronic device 201 (such as a menu).

Figure 8:
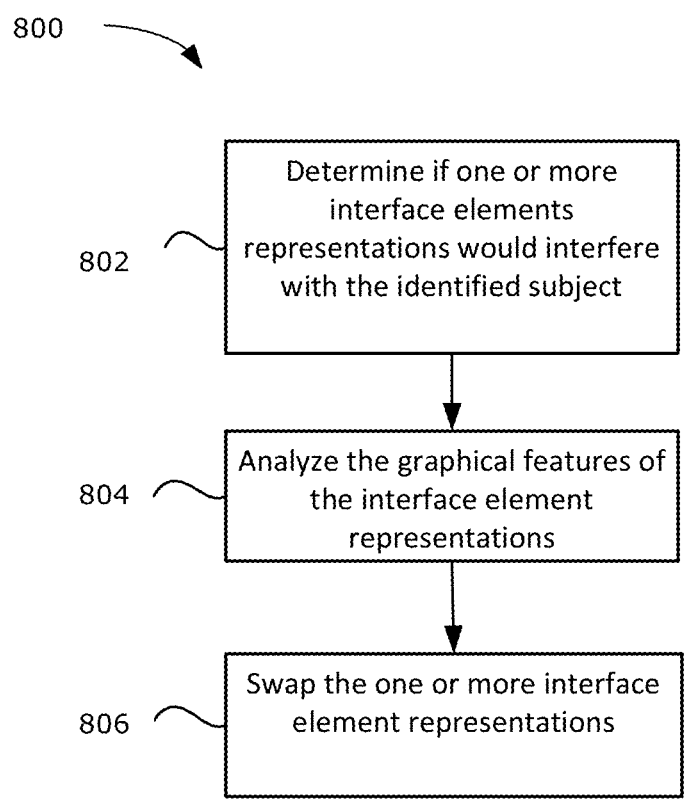
FIG. 8 is a flowchart illustrating another example method of overlaying interface element representations on the viewfinder in accordance with example embodiments of the present disclosure.

Referring next to FIG. 8, a flowchart of another example method 800 of overlaying the interface element representations on a viewfinder is illustrated. The electronic device 201 may be configured to perform the method 800 of FIG. 8. In at least some example embodiments, the processor 240 of the electronic device 201 is configured to perform the method 800 of FIG. 8. One or more applications 225 or modules on the electronic device 201 may contain computer readable instructions which cause the processor 240 of the electronic device 201 to perform the method 800 of FIG. 8. In at least some example embodiments, the camera application 280 stored in memory of the electronic device 201 is configured to perform the method 800 of FIG. 8. More particularly, the camera application 280 may contain computer readable instructions which, when executed, cause the processor 240 to perform the method 800 of FIG. 8. It will be appreciated that the method 800 of FIG. 8 may, in at least some example embodiments, be provided by other software applications or modules apart from those specifically discussed above; for example the operating system 223. Accordingly, any features which are referred to as being performed by the electronic device 201 may be performed by any one or more of the software applications or modules referred to above or other software modules. In at least some example embodiments, at least some of the method 800 of FIG. 8 may be performed by or may rely on other applications 225 or modules.

In at least some embodiments, the method 800 may be performed at 408 of the method 400 of FIG. 4.

The method 800 includes, at 802, determining whether one or more interface element representations 608a, 608b, 608c would interfere with the identified subject 604 if the interface element representations 608a, 608b, 608c were overlaid on the viewfinder 601. 802 may be performed in the same manner as 502 which is discussed in greater above with reference to FIG. 5.

At 804, if it is determined that the current arrangement of the interface element representations 608a, 608b, 608c interferes with the identified subject 604, the electronic device 201 analyzes the graphical features of the interface element representations 608a, 608b, 608c. For example, if the electronic device 201 determines that an interface element representation 608a, 608b, 608c covers or partially covers the identified subject 604, the electronic device 201 may analyze the graphical features of each of the overlaid interface element representations 608a, 608b, 608c.

In at least some example embodiments, in analyzing the graphical features of the interface element representations 608a, 608b, 608c, the electronic device 201 may analyze one or more of: the colour, shape, boundaries, effects or size of the interface element representations 608a, 608b, 608c. In such example embodiments, the graphical features of the interface element representations 608a, 608b, 608c may be compared to the graphical features of the identified subject 604. For example, the electronic device 201 may compare the level of visual obscurity between an interface element representation 608a, 608b, 608c and the identified subject 604, based on the graphical features. That is, based on the comparison, the electronic device 201 may determine that an interface element representation 608a, 608b, 608c may have a lower, higher or same level of obscurity than another interface element representation 608a, 608b, 608c when the interface element representations 608a, 608b, 608c are covering or partially covering the identified subject 604 (for example, with reference to the example viewfinder 601 of FIG. 6, the visual features of each of the interface element representations 608a, 608b, 608c (i.e. the video, messages, music icons, etc.) are compared to the visual features of the identified subject 604 (i.e. the car) to determine which interface element representation 608a, 608b, 608c has the lowest level of obscurity of the identified subject 604 when the interface element representations 608a, 608b, 608c are covering or partially covering the identified subject 604 (for example, when placed at the same position as the interface element representation video icon 608a interfering with the car).

After analyzing the graphical features of the interface element representations 608a, 608b, 608c, the electronic device 201, at 806, may swap the one or more interface element representations 608a, 608b, 608c interfering with the identified subject 604 with one or more interface element representations 608a, 608b, 608c not interfering with the identified subject 604 based on the graphical features of the interface element representations 608a, 608b, 608c. For example, the position of an interface element representation 608a, 608b, 608c covering or partially covering the identified subject 604 on the viewfinder 601 is inter-changed with an interface element representation 608a, 608b, 608c not covering the identified subject 604 on the viewfinder 601 based on the graphical feature analysis of the interface element representations 608a, 608b, 608c.

In at least some example embodiments, the interface element representation 608a, 608b, 608c covering or partially covering the identified subject 604 is swapped with an interface element representation 608a, 608b, 608c not covering the identified subject 604 that has the lowest level of obscurity of the identified subject 604 as determined when analyzing the graphical features of the interface element representations 608a, 608b, 608c. For example, with reference to the example viewfinder 601 of FIG. 6, the video icon interface element representation 608a interfering with the identified subject 604 may be swapped with the music icon interface element representation 608c, which is not interfering with the identified subject 604 if the music icon is determined to have the lowest level of obscurity of the identified subject 604.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method for providing a wallpaper preview on an electronic device, the method comprising:

receiving image data at the electronic device;

displaying a wallpaper preview on a display of the electronic device based on the image data;

identifying a subject in the image data; and overlaying one or more interface element representations on a portion of the displayed wallpaper preview which does not contain the identified subject, the interface element representations depicting interface elements associated with a graphical user interface of the electronic device, wherein overlaying comprises:

determining whether a current arrangement of the interface element representations would interfere with the identified subject if the interface element representations were overlaid on the wallpaper preview;

when the current arrangement of the interface element representations would interfere with the identified subject, providing a new arrangement of the interface element representations which reduces interference with the identified subject; and displaying the interface element representations on the wallpaper preview in accordance with the new arrangement of the interface element representations, wherein providing a new arrangement comprises analyzing the graphical features of the interface element representations and swapping positions of one or more of the interface element representations to reduce visual obscurity of the identified subject.

2. The method of claim 1, wherein providing a new arrangement includes moving one or more interface element representations in the current arrangement of the interface element representations.

3. The method of claim 1, wherein providing a new arrangement includes removing one or more interface element representations from the current arrangement of the interface element representations.

4. The method of claim 1, wherein identifying the subject includes:
analyzing the image data to identify facial features associated with the subject in the image data.

5. The method of claim 1, further comprising:
prior to overlaying the one or more interface element representations, presenting a prompt requesting confirmation to overlay the one or more interface element representations; and
when confirmation is received, overlaying the one or more interface element representations.

6. The method of claim 1, further comprising:
receiving an instruction to capture an image; and
in response to receiving the instruction, capturing the image with a camera.

7. The method of claim 6, further comprising:
displaying the captured image as a wallpaper on the graphical user interface,
and arranging interface elements on the graphical user interface in accordance with an arrangement of the interface element representations when the image was captured.

8. The method of claim 6, further comprising:
in response to capturing the image with the camera, presenting a prompt requesting confirmation to display the captured image as the wallpaper on the graphical user interface; and
when confirmation is received, displaying the captured image as the wallpaper on the graphical user interface.

9. The method of claim 6, further comprising:
storing the captured image in a memory of the electronic device.

10. The method of claim 1, wherein the interface element representations are selectable.

11. The method of claim 1, wherein the interface elements are icons providing shortcuts for accessing applications.

12. An electronic device comprising:
a memory;
a display;
a camera; and
a processor coupled with the memory, the display, and the camera, the processor being configured to:
receive image data;
display a wallpaper preview on the display of the electronic device based on the image data;
identify a subject in the image data; and
overlay one or more interface element representations on a portion of the displayed wallpaper preview which does not contain the identified subject, the interface element representations depicting interface elements associated with a graphical user interface of the electronic device, wherein overlaying comprises:
determining whether a current arrangement of the interface element representations would interfere with the identified subject if the interface element representations were overlaid on the wallpaper preview;
when the current arrangement of the interface element representations would interfere with the identified subject, providing a new arrangement of the interface element representations which reduces interference with the identified subject; and
displaying the interface element representations on the wallpaper preview in accordance with the new arrangement of the interface element representations, wherein providing a new arrangement comprises analyzing the graphical features of the interface element representations and swapping positions of one or more of the interface element representations to reduce visual obscurity of the identified subject.

13. The electronic device of claim 12, wherein providing a new arrangement includes moving one or more interface element representations in the current arrangement of the interface element representations.

14. The electronic device of claim 12, wherein providing a new arrangement includes removing one or more interface element representations from the current arrangement of the interface element representations.

15. The electronic device of claim 12, wherein the processor is configured to identify the subject by:
analyzing the image data to identify facial features associated with the subject in the image data.

16. A non-transitory computer-readable storage medium having stored thereon computer executable instructions, the computer executable instructions including instructions for:
receiving image data;
displaying a wallpaper preview on a display of an electronic device based on the image data;
identifying a subject in the image data; and
overlaying one or more interface elements representations on a portion of the displayed wallpaper preview which does not contain the identified subject, the interface element representations depicting interface elements associated with a graphical user interface of the electronic device, wherein overlaying comprises:
determining whether a current arrangement of the interface element representations would interfere with the identified subject if the interface element representations were overlaid on the wallpaper preview;
when the current arrangement of the interface element representations would interfere with the identified subject, providing a new arrangement of the interface element representations which reduces interference with the identified subject; and
displaying the interface element representations on the wallpaper preview in accordance with the new arrangement of the interface element representations, wherein providing a new arrangement comprises analyzing the graphical features of the interface element representations and swapping positions of one or more of the interface element representations to reduce visual obscurity of the identified subject.

* * * * *